United States Patent
Bulzacchelli et al.

(10) Patent No.: US 8,126,045 B2
(45) Date of Patent: Feb. 28, 2012

(54) SYSTEM AND METHOD FOR LATENCY REDUCTION IN SPECULATIVE DECISION FEEDBACK EQUALIZERS

(75) Inventors: John Francis Bulzacchelli, Yonker, NY (US); Gautam Gangasani, Hopewell Junction, NY (US); Mounir Meghelli, Tarrytown, NY (US); Sergey V. Rylov, White Plains, NY (US); Michael A. Sorna, Hopewell Junction, NY (US); Steven J. Zier, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 12/201,487

(22) Filed: Aug. 29, 2008

(65) Prior Publication Data

US 2010/0054324 A1    Mar. 4, 2010

(51) Int. Cl.
*H03H 7/40*    (2006.01)
(52) U.S. Cl. ............... 375/233; 375/350; 708/323
(58) Field of Classification Search .......... 375/229, 375/230, 232, 233, 346, 350; 708/300, 303, 708/306, 322, 323
See application file for complete search history.

(56) References Cited

U.S. PATENT DOCUMENTS

| | | | |
|---|---|---|---|
| 6,535,553 B1 | 3/2003 | Limberg et al. | |
| 7,715,474 B2* | 5/2010 | Park et al. | 375/233 |
| 7,792,187 B2* | 9/2010 | Bulzacchelli | 375/233 |
| 7,822,114 B2* | 10/2010 | Bulzacchelli et al. | 375/233 |
| 2005/0025182 A1 | 2/2005 | Nazari | |
| 2006/0291552 A1* | 12/2006 | Yeung et al. | 375/233 |
| 2008/0069199 A1* | 3/2008 | Chen et al. | 375/233 |

OTHER PUBLICATIONS

T. Beukema et al., A 6.4-Gb/s CMOS SerDes Core with Feed-Forward and Decision-Feedback Equalization, IEEE J. Solid-State Circuits, vol. 40, pp. 2633-2645, Dec. 2005.
S. Kasturia and J. H. Winters, Techniques for High-Speed Implementation of Nonlinear Cancellation, IEEE J. Sel. Areas Commun., vol. 9, pp. 711-717, Jun. 1991.
Leibowitz et al.; A 7.5Gb/s 10-Tap DFE Receiver with First Tap Partial Response, Spectrally Gated Adaptation, and 2nd-Order Data-Filtered CDR; IEEE International Solid-State Circuits Conference; 2007; pp. 228, 229 and 599.
R. Payne et al, A 6.25-Gb/s Binary Transceiver in 0.13 m CMOS for Serial Data Transmission Across High Loss Legacy Backplane Channels, IEEE J. Solid-State Circuits, vol. 40, pp. 2646-2657, Dec. 2005.

* cited by examiner

*Primary Examiner* — Dac Ha
(74) *Attorney, Agent, or Firm* — Tutunjian & Bitetto, P.C.; Anne V. Dougherty

(57) ABSTRACT

A decision feedback equalizer (DFE) and method include summer circuits configured to add a dynamic feedback tap to a received input to provide a sum and to add a speculative static tap to the sum. Sense amplifiers are configured to receive outputs of the summer circuits and evaluate the outputs of the summer circuits in accordance with a clock signal. A passgate multiplexer is configured to receive outputs from sense amplifiers wherein the multiplexers is clock-gated for isolation of subsequent ciruitry from the outputs of the sense amplifiers during a precharged period. A gating circuit is configured to perform gating of a selected signal output from a second circuit portion with a clock signal and to enable the isolation of the subsequent circuitry by the multiplexer during the precharge period. A regenerative buffer is coupled to the multiplexer to maintain an output of the multiplexer during the precharge period, to provide the select signal for a passgate multiplexer in the second circuit portion of the DFE and to drive the dynamic feedback tap on the first circuit portion of the DFE.

20 Claims, 3 Drawing Sheets

SYSTEM AND METHOD FOR LATENCY REDUCTION IN SPECULATIVE DECISION FEEDBACK EQUALIZERS

BACKGROUND

1. Technical Field

The present invention relates to equalization techniques for high-speed data communications that involve Decision Feedback Equalizers (DFE) and more specifically to implementations of speculative DFEs using CMOS circuits.

2. Description of the Related Art

High-speed data interconnects used in modern computing systems and data communication routers currently operate at data rates that usually exceed the bandwidth of a physical channel used for data transmission. Therefore, such communications require the use of channel equalization, i.e., compensation for signal distortions caused by finite channel bandwidth. These distortions are known as Inter-Symbol Interference (ISI).

The most common technique used for equalization of high-loss channels (e.g., 20-30 dB high frequency attenuation) is known as a decision-feedback equalizer (DFE). The critical advantage of DFE over regular linear filters is its ability to flatten the channel response (and hence reduce signal distortion) without amplifying noise or crosstalk.

In a DFE, the previously received bits are fed back with weighted tap coefficients and added to the received input signal using circuits known as summing amplifiers. If the magnitudes and polarities of the tap weights are properly adjusted to match the channel characteristics, the ISI from the previous bits in the data stream will be cancelled, and the bits can be detected by a data slicer (a circuit that determines whether a signal is above or below a given threshold) with a low bit error rate (BER). The adjustment of the tap weights can be performed either manually or automatically by an appropriate adaptive algorithm.

A major challenge in the design of a DFE operating at a very high data rates (multiple gigabits per second) is ensuring that the feedback signals have sufficiently low latency to allow the slicer input to settle accurately before the next data decision is made. If a full-rate DFE architecture is used, the feedback loop delay (including the decision-making time of the slicer and the analog settling time of the DFE summing amplifiers) needs to be less than one data unit interval (UI), i.e. less than one period of a full-rate clock. If one switches to a half-rate architecture (with associated doubling of the clock period to 2 UI), the requirement to circuit latency stays the same, i.e., it is not relaxed, as there is still only one UI available to establish the feedback from the previously detected bit, weighted by the first tap coefficient (denoted as h1).

A common technique used to relax the latency requirement of a DFE is known as speculation or loop unrolling. In this approach, both +h1 and −h1 tap weights are added to the input signal using two identical summing amplifiers. Since (for binary data transmission) the previous bit can only have two different values, one of these DC offsets added to the input signal represents the correct compensation of the ISI due to the previous bit. The outputs of the two summing amplifiers are applied to two identical slicers to produce two tentative data decisions. Once the previous bit is known, the data decision corresponding to correct polarity of hi compensation is selected with a 2:1 multiplexer (MUX).

Since the h1 compensation is implemented as multiple DC offsets (static taps) instead of a dynamically changing feedback signal, analog settling time requirements for the first DFE feedback tap are eliminated, while the next tap (h2) can have 2 UIs of latency, i.e., the maximum latency limit was doubled. Note that the bit controlling the MUX must still arrive within 1 UI, but this latency requirement is "digital", i.e., it does not involve analog settling processes that require high accuracy. Therefore, the speculative DFE technique replaces a critical analog loop with 1 UI latency (h1 loop) with a combination of an analog loop with 2 UI latency (h2 loop) and a digital loop with 1 UI latency (MUX select loop), which is substantially easier to satisfy.

The reason for particular attention to the latency of DFE feedback loops is that in many designs this latency becomes the primary limitation on the maximum clock speed of the overall circuit. This is an important issue with DFE circuits implemented with CMOS logic as opposed to more conventional current-mode logic (CML), because while CMOS circuits operate with clock speeds comparable to CML and provide substantial savings in power and area, they have generally higher latency than CML parts.

To reduce the latency of DFE feedback loops designers try to minimize the total number of stages within the loop. The state-of-the-art CML DFE implementations use a three-stage CML circuit to convert the analog signal from the output of the summers to a valid digital DFE output. For example, in a recently proposed speculative DFE, a set of summers is followed by the following three stages of CML circuits: a master latch, a 2:1 multiplexer and a slave latch. However, even a three-stage topology poses substantial challenges for its efficient implementation with CMOS logic, and therefore even a lower-latency two-stage implementation of this function in CMOS logic is highly desirable.

SUMMARY

A decision feedback equalizer (DFE) and method include summer circuits configured to add a dynamic feedback tap to a received input to provide a sum and to add a speculative static tap to the sum. Sense amplifiers are configured to receive outputs of the summer circuits and evaluate the outputs of the summer circuits in accordance with a clock signal. A passgate multiplexer is configured to receive outputs from sense amplifiers wherein the multiplexer is clock-gated for isolation of subsequent circuitry from the outputs of the sense amplifiers during a precharge period. A gating circuit is configured to perform gating of a select signal output from a second circuit portion with a clock signal and to enable the isolation of the subsequent circuitry by the multiplexer during the precharge period. A regenerative buffer is coupled to the multiplexer to maintain an output of the multiplexer during the precharge period, to provide the select signal for a passgate multiplexer in the second circuit portion of the DFE and to drive the dynamic feedback tap on the first circuit portion of the DFE.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
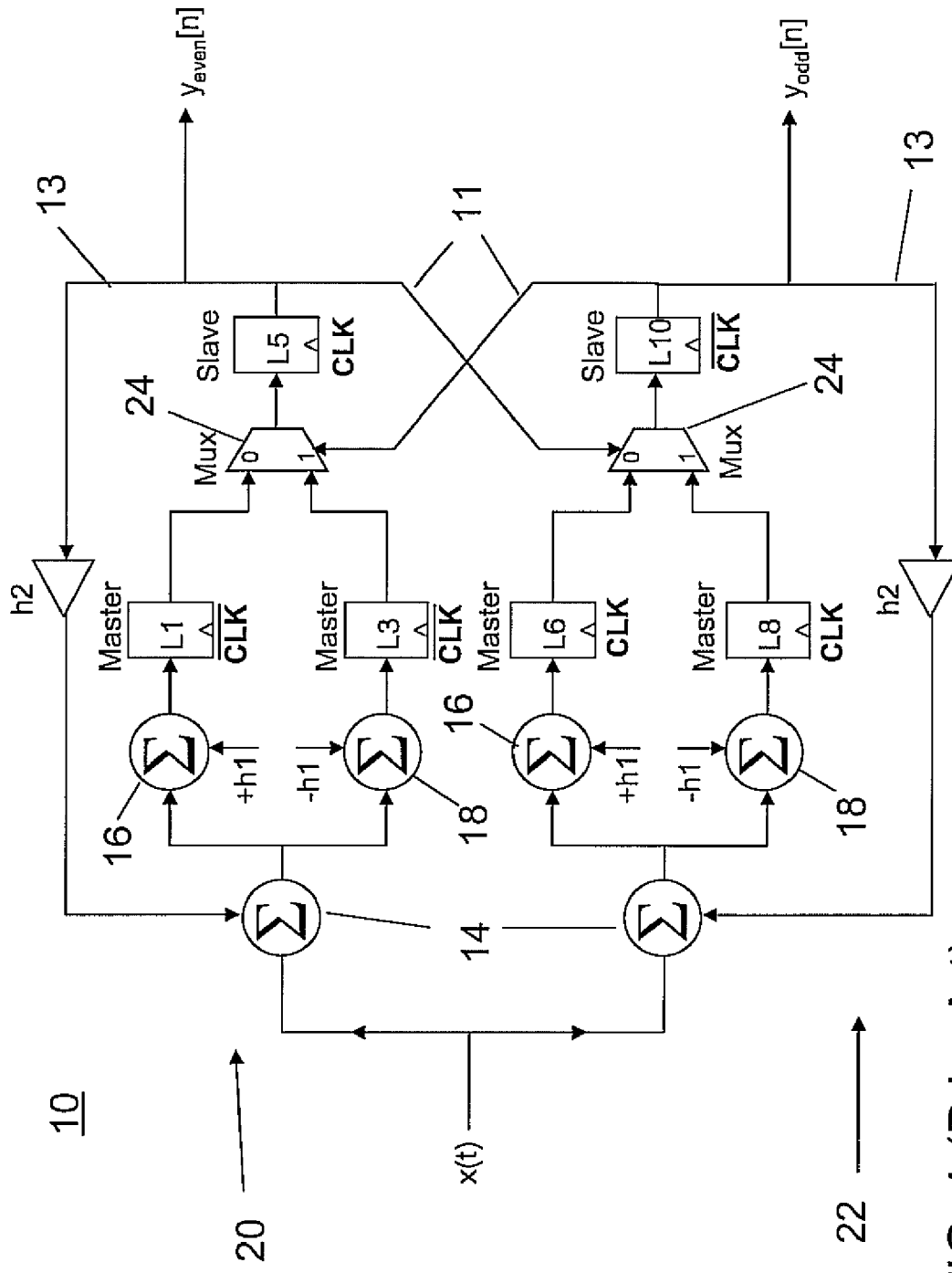
FIG. 1 is a block diagram showing a prior art half-rate CML DFE architecture.

The present principles provide a new arrangement of components in a speculative digital feedback loop, e.g., a loop employed in a decision feedback equalizer (DFE), where this new arrangement permits a relaxation of the timing requirements of a critical path over previously known topologies. In the context of high data input/output (I/O) implementations, these new architectures provide sufficient margin to permit the replacement of previously-used current mode logic (CML) stages with complementary metal oxide semiconductor (CMOS) stages, enabling the achievement of a significant power and area benefits for the resulting design without latency concerns.

In accordance with some embodiments, a multiplexer, i.e., MUX and a latch (each requiring one separate stage in CML implementation) are merged into a single CMOS circuit that has a latency similar to that of a simple non-multiplexing static CMOS latch (a single-stage circuit). The latter circuit (static CMOS latch) may be composed of two parts: a passgate switch for input isolation, and a storage element (e.g., a cross-coupled pair of tri-state inverters) for holding the latched output. The new multiplexing latch circuit replaces the single passgate switch of a static CMOS latch with a pair of passgate switches that implement a 2:1 MUX, i.e., these switches connect the storage element of the latch to either a first or second input of the new circuit during the transparent latch phase, and completely disconnect it from the both inputs during the opaque (holding) phase. To properly operate the switches, additional circuitry may be included (e.g., single-stage domino buffers) that generates appropriate clock-gated select signal(s).

Embodiments of the present invention can take the form of an entirely hardware embodiment, an entirely software embodiment or an embodiment including both hardware and software elements. In a preferred embodiment, the present invention is implemented in hardware but may include software elements, which may include but are not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A circuit as described herein may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GDSII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now to the drawings in which like numerals represent the same or similar elements and initially to FIG. 1, a block diagram of a prior art half-rate speculative DFE (Digital Feedback Equalizer) 10 that uses CML gates is illustratively shown. For simplicity, DFE 10 shows a feedback configuration involving only two taps 11 and 13 (i.e., two prior samples), however it can easily be extended to a larger number of DFE taps since additional taps will have large latency (3UIs or more) and will not create new latency constraints.

Each half-circuit 20 and 22 of this CML DFE 10 includes three summers 14, 16 and 18 with associated digital to analog converters (DACs) (h2, +h1, −h1), two front-end CML master latches (L1 and L3 or L6 and L8) that produce two tentative output bit values, a 2:1 CML multiplexer (MUX) 24 that selects between output bit values, a correct output bit value based on a select signal from an opposite half-circuit and a CML slave latch (L5 or L10) that holds the output steady for proper operation of two feedback loops (11 or 13). The output of the last latch (L5 or L10) drives both the input of the h2

DAC (that drives h2 summer 14 within the same half-circuit) and the select input of the MUX 24 in the opposite half-circuit, which selects one of +h1 and −h1 (static taps). These two feedback paths 13 and 11 are respectively referred to as an analog feedback loop (or h2 loop (for the dynamic tap)) and a digital feedback loop (or speculative (static) h1 loop) This naming reflects the fact that the first loop 13 applies a variable analog input to the h2 summer 14 that must settle to its target value with sufficient precision, while the second loop 11 applies a digital select signal to a digital circuit (2:1 MUX 24), so high precision is not required.

A prominent feature of this particular prior-art topology is that the MUX produces a valid digital DFE output only during one half of the clock cycle (when the master latches (L1, L3 or L6, L8) in front of it regenerate and the slave latch (L5 or L10) of the other half-circuit (22 or 20) holds the valid value of its respective select signal). During the remaining half-cycle the slave latch (L5 or L10) behind the MUX 24 holds that correct DFE output value to properly operate the analog and the digital feedback loops 13 and 11. The main advantage of this topology is that it nominally applies the select signal value to the MUX one UI in advance before the MUX output is latched and therefore provides the digital feedback loop 11 with ample latency margin, so the critical latency path is virtually always associated with the analog feedback loop 13.

The CML topology shown in FIG. 1, despite its many attractive features, meets certain challenges when one attempts to implement it in CMOS by direct mapping of its CML components to available CMOS counterparts. Transition from CML to CMOS circuitry is highly desirable due to substantial savings in power and area. However, direct-mapping is not possible since there is a lack of one-to-one replacement for many CML circuits in a CMOS implementation. For example, the fastest high-sensitivity latch in CMOS (i.e. the one most suitable for a high-performance front-end latch) would have to be implemented with a sense-amplifier circuit that is very different in its properties from a CML latch. In particular, a sense amplifier itself, as a dynamic circuit, spends one half of the clock cycle in a pre-charge mode, when both of its dual-rail outputs are equal to the supply voltage. In contrast, a CML latch during the similar clock half-cycle would be "transparent", i.e., it would operate as a buffer and pass its input directly to the output. To obtain a true latch out of a sense-amp circuit, a slave latch circuit (such as an RS flip flop or a clocked CMOS latch) is needed. However such a combination would not form just a simple master latch, but a master-slave pair, and therefore would not be directly applicable to realize the topology shown in FIG. 1.

In accordance with the present principles, the present inventors have realized that the topology in FIG. 1 is insensitive to the MUX inputs during the half of the clock cycle when its original front-end CML latch is transparent and a corresponding sense amp would be pre-charging. In this case, bare sense-amps can be employed to drive the MUX in that topology without any loss of functionality. However, this finding is not obvious, and represents a starting point for the present principles, which are concerned with a specific way to realize in CMOS a low-latency MUX-slave-latch combination that can be efficiently driven with a bare sense amplifier.

Figure 2:
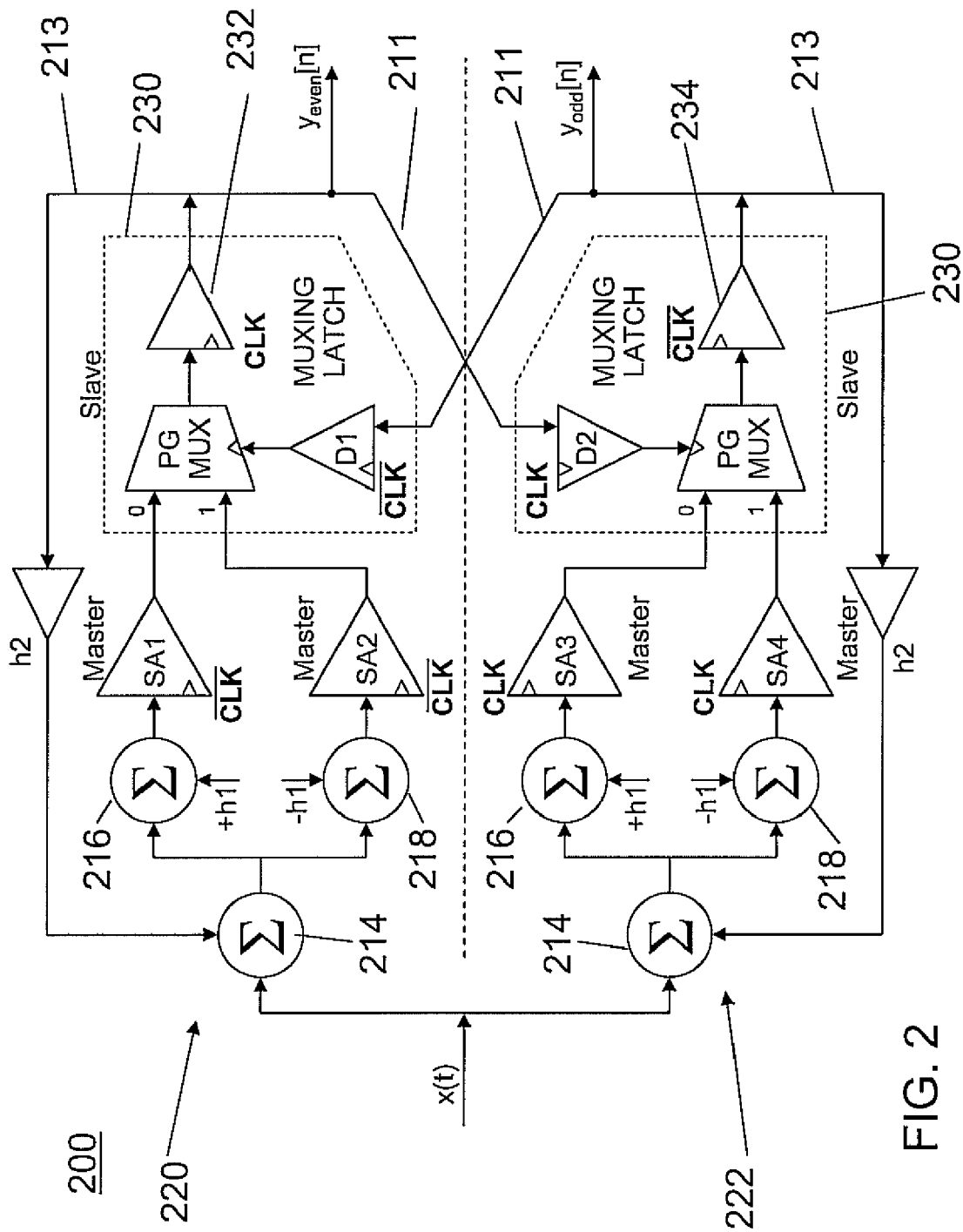
FIG. 2 is a schematic diagram showing a half-rate CMOS DFE architecture in accordance with one illustrative embodiment.

Referring to FIG. 2, a block diagram showing a CMOS implementation of a DFE 200 in accordance with the present principles. DFE 200 shows a feedback configuration involving only two taps 211 and 213 (i.e., two prior samples), however it can easily be extended to a larger number of DFE taps since additional taps will have large latency (3 UIs or more) and will not create new latency constraints. Each half-circuit 220 and 222 of this DFE 200 includes three summers 214, 216 and 218 with associated input tap weights (h2, +h1, −h1).

While the exchange of signals between first and second half circuits is set forth in this example, a general fractional-rate (1/N-rate) circuit may be employed, that has N circuit portions (1 to N), and portion k receives a select signal from portion k−1, provides a select signal to portion k+1 and provides a dynamic feedback signal h2 to portion k+2, provides a dynamic signal h3 to portion k+3, etc. Furthermore, the present principles apply to a case of N=1, i.e. a full-rate circuit that would have a second portion providing a select signal to a first portion.

DFE 200 differs from the configuration in FIG. 1 by replacement of the CML front-end (master) latches with CMOS sense-amplifiers SA1-SA4 and by replacement of the subsequent CML MUX and slave latch circuits with a single CMOS MUX-latch combination 230, each including a pass-gate multiplexer (PGMUX) driven by a set of clock-gated select signals (211) and a clocked regenerative buffer 232 or 234 that can latch the output of that PGMUX. Topologically, the MUX-latch circuit 230 can be considered an extension of a CMOS latch using a clocked passgate D1 or D2 for input isolation and a clocked regenerative buffer 232 or 234 for latching. This means that the new latching MUX circuit 230 has a latency close to that of a single CMOS latch thus bringing the overall latency of circuit 200 to that of a two-stage circuit—a master-slave latch. This is to be compared to the topology of the original CML circuit shown in FIG. 1 that has three distinct CML stages (a master latch, a MUX, and a slave latch), so the CMOS implementation advantageously eliminates one stage out of three from the direct signal path (which is a part of the latency-critical analog feedback loop).

Such latency reduction in the CMOS version is achieved by placing some logic functions associated with the PGMUX operation (select-gating circuitry D1 or D2)) onto the digital feedback path 211 (select path). In one embodiment, the associated circuits are single-stage dual-rail domino buffers (p and n type) (D1, D2) that pass the select signals through during an evaluation half of the clock cycle and block (gating) the select signals during a precharge half cycle. The associated latency of additional circuits D1, D2 is extremely low (e.g., about one inverter delay) and is easily tolerable within the chosen topology, since the basic topology of FIG. 1, e.g., is known to have substantial latency margin on its select path.

Sense amplifiers SA1-SA4 function as master latches for data-slicing (to make decisions relative to a threshold) the signals from summers 216 and 218. The summers are driven by input x(t). In one embodiment, for illustration purposes, SA1 and SA2 of circuit half 220 are clocked by CLK bar ($\overline{\text{CLK}}$) while SA3 and SA4 of the other half circuit 222 are clocked using CLK. Circuits D1 and D2 of a respective half are clocked by a same clock signal (CLK bar or CLK) in accordance with the sense amplifiers (SA) of their respective half, while the regenerative buffers 232 and 234 are clocked with a clock signal opposite to the sense amplifiers of the half circuit in which the buffers are located. Output bits $y_{even}[n]$ or $y_{odd}[n]$ will drive the feedback loops to equalize the input x(t).

Figure 3:
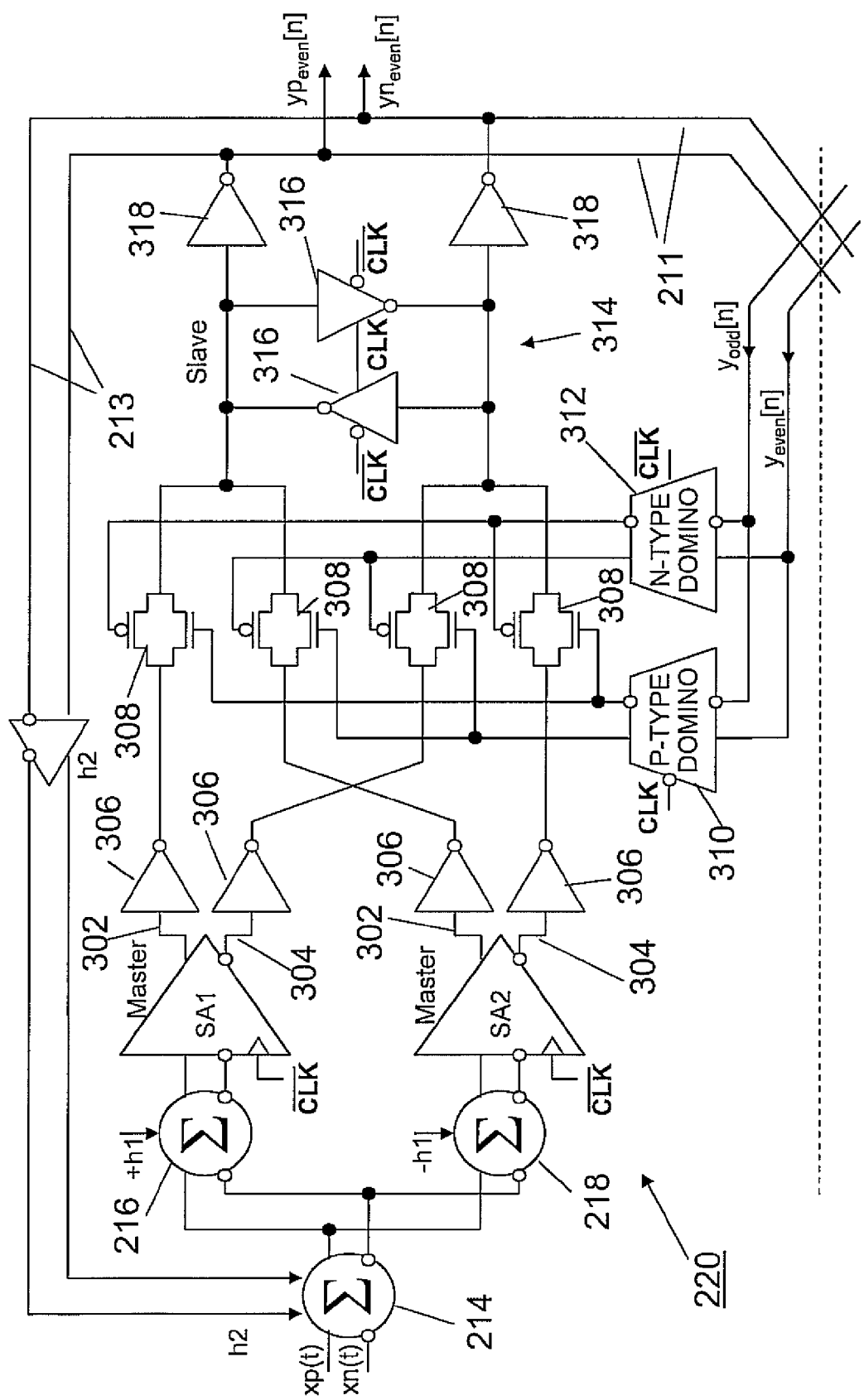
FIG. 3 is a more detailed view of one half-circuit of half-rate CMOS DFE architecture represented in FIG. 2 in accordance with the illustrative embodiment.

Referring to FIG. 3, the circuit 200 of FIG. 2 is shown in greater detail for the half circuit 220, which will be used to explain operations of the circuit through a clock cycle. The sense amplifiers SA1 and SA2 that follow the summers 214, 216 and 218 are preferably single-stage clocked CMOS circuits with differential input and dual-rail output. During a precharge half-cycle (clock low) both outputs 302 and 304 of the sense amplifiers SA1 and SA2 are brought to a supply voltage level, while during an evaluate clock half-cycle one of the two outputs 302 and 304 (depending on the polarity of the input differential voltage) discharges to ground and the other remains high.

The two sense amplifiers SA1 and SA2 with dual-rail outputs are followed by one inverter stage 306 for the purpose of additional gain and isolation from any kick-back from the subsequent clocked circuits. The inverters 306 drive two 2:1 complementary passgate MUXes 308 (one per output rail), and within each MUX 308 only one passgate can be on (or both can be off) as controlled by select-gating circuits 310 and 312. Each passgate 308 includes an n-fet and a p-fet transistor. In this case, select-gating circuit 310 is a p-type domino circuit and select-gating circuit 312 is an n-type domino circuit. Activation of passgates 308 is controlled by both the select signal and the clock, specifically, each passgate 308 is controlled by the outputs of two single-stage domino buffers 310 and 312. Domino buffer 312 of n-type drives the p-fets of the passgates 308, while p-type domino buffer 310 drives the n-fets of the passgates 308. Therefore, during the precharge half-cycle such buffers apply high voltage to the p-fets and low voltage to the n-fets respectively thus keeping all passgates 308 off.

While all passgates 308 stay off and the subsequent circuitry is completely disconnected from the sense amplifier outputs 302 and 304, a regenerative stage 314 (e.g., a cross-coupled pair of tri-state inverters 316) holds the previous MUX output value. Once the precharge half-cycle completes, the select signal propagates through the domino buffers (310 and 312) from the output of another half circuit and activates the intended passgates in that half circuit.

This connects the appropriate sense amplifiers to the regenerative inverter buffer stage 314 which now would be transparent at that time and therefore will propagate the results of evaluation of the preceding selected sense amplifier as soon as this result is generated. With arrival of the next clock half-cycle and de-activation of the passgates 308, the regenerative inverter buffer 314 would again latch the MUX output and maintain it steady for proper operation of feedback loops 211 and 213.

The regenerative tri-state inverter pair 316 is followed by one extra inverter stage 318 that serves as an output driver stage that drives the two feedback loops 213 and 211 (analog and digital) and the final DFE digital output (y[n], which includes $yp_{even}[n]$ and $yn_{even}[n]$ or $yp_{odd}[n]$ and $yn_{odd}[n]$ depending on the circuit half and the input xp(t) or xn(t)).

The foregoing illustratively described a half-rate DFE implementation. However, the present principles are equally applicable to any fractional-rate implementation, including but not limited to quarter-rate, ⅛ rate, etc. architectures, and such modification can be implemented by those skilled in the art in view of the present teachings.

The present description has focused on the equalization of binary (two-level) signals. However, the concepts described herein are also applicable to the equalization of multi-level signals, such as four-level pulse amplitude modulation (PAM-4) signals, etc.

Having described preferred embodiments of a system and method for latency reduction in speculative decision feedback equalizers (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A decision feedback equalizer (DFE), comprising:
   a first circuit portion, including:
   summer circuits configured to add at least one dynamic feedback tap to a received input to provide a sum and to add at least one speculative static tap to the sum;
   sense amplifiers configured to receive outputs of the summer circuits and evaluate the outputs of the summer circuits in accordance with a clock signal;
   a passgate multiplexer configured to receive outputs from at least two sense amplifiers wherein the multiplexer is clock-gated for isolation of subsequent circuitry from the outputs of at least two sense amplifiers during a precharge period of the sense amplifiers;
   a gating circuit configured to perform gating of a select signal output from a second circuit portion with a clock signal and to enable the isolation of the subsequent circuitry by the multiplexer during the precharge period; and
   a regenerative buffer coupled to the multiplexer to maintain an output of the multiplexer during the precharge period, to provide the select signal for a passgate multiplexer in the second circuit portion of the DFE and to drive the at least one dynamic feedback tap to a summer circuit on the first circuit portion of the DFE.

2. The DFE as recited in claim 1, wherein the DFE includes complementary metal oxide semiconductor (CMOS) technology.

3. The DFE as recited in claim 1, wherein the DFE includes a multi-level DFE, where the multi-level includes greater than two levels.

4. The DFE as recited in claim 1, wherein the passgate multiplexer includes at least one complementary metal oxide semiconductor passgate having an n-type field effect transistor and a p-type field effect transistor.

5. The DFE as recited in claim 4, wherein the gating circuit includes two single-stage domino buffers, one of p-type and one of n-type to control n-type and p-type field-effect transistors of the passgate multiplexer such that during the precharge period, passgates of the passgate multiplexer remain off.

6. The DFE as recited in claim 1, wherein the at least two sense amplifiers output to an inverter stage to provide a gain and isolation from any kick-back from subsequent clocked circuits.

7. The DFE as recited in claim 1, wherein the regenerative buffer includes a pair of cross-coupled tristate inverters configured to maintain the output of the passgate multiplexer during the pre-charge period.

8. The DFE as recited in claim 7, wherein the regenerative buffer includes an inverter stage that serves as an output driver stage that drives feedback loops for the dynamic tap and the speculative tap.

9. A decision feedback equalizer (DFE), comprising:
   a first half circuit configured to process even data bits and a second half circuit configured to process odd data bits, each half circuit including complementary metal oxide semiconductor (CMOS) technology, comprising:
   summer circuits configured to add at least one dynamic feedback tap to a received input to provide a sum and to add at least one speculative static tap to the sum;
   sense amplifiers configured to receive outputs of the summer circuits and evaluate the outputs of the summer circuits in accordance with a clock signal;

a passgate multiplexer configured to receive outputs from at least two sense amplifiers wherein the multiplexer is clock-gated for isolation of subsequent circuitry from the outputs of at least two sense amplifiers during a precharge period of the sense amplifiers;

a gating circuit configured to perform gating of a select signal output from a different half circuit with a clock signal and to enable the isolation of subsequent circuitry by the multiplexer during the precharge period; and a regenerative buffer coupled to the multiplexer to maintain an output of the multiplexer during the precharge period, to provide the select signal for a passgate multiplexer in the different half circuit of the DFE and to drive the at least one dynamic feedback tap to a summer circuit on a same half circuit of the DFE.

10. The DFE as recited in claim 9, wherein the DFE includes a multi-level DFE, where the multi-level includes greater than two levels.

11. The DFE as recited in claim 9, wherein the passgate multiplexer includes at least one CMOS passgate having an n-type field effect transistor (n-fet) and a p-type field effect transistor (p-fet), wherein the gating circuit includes two single-stage domino buffers, one of p-type and one of n-type to control the nfet and pfet of the passgate multiplexer such that during the precharge period, passgates of the passgate multiplexer remain off.

12. The DEE as recited in claim 9, wherein the at least two sense amplifiers output to an inverter stage to provide a gain and isolation from any kick-back from subsequent clocked circuits.

13. The DFE as recited in claim 9, wherein the regenerative buffer includes a pair of cross-coupled tristate inverters configured to maintain the output of the passgate multiplexer during the precharge period.

14. The DFE as recited in claim 13, wherein the regenerative buffer includes an inverter stage that serves as an output driver stage that drives feedback loops for the dynamic tap and the static tap.

15. A method for complementary metal oxide semiconductor (CMOS) decision feedback equalization, comprising:

providing a set of summer circuits configured to add a dynamic feedback signal representing a dynamic tap and a static feedback representing speculative tap to a received input;

evaluating outputs of the summer circuits in accordance with a clock signal by at least two sense amplifiers;

selecting the data bits from the at least two sense amplifiers by a passgate multiplexer in accordance with a select feedback output from another DFE circuit such that the passgate multiplexer provides isolation for subsequent circuitry during a precharge period of the sense amplifiers;

maintaining an output of the passgate multiplexer during the precharge period of the sense amplifiers; and outputting data bits to provide a select signal for a second passgate multiplexer on a different section of a decision feedback equalizer (DFE) and to drive the dynamic feedback signal to a summer circuit on a same section of the DFE.

16. The method as recited in claim 15, wherein the passgate multiplexer includes at least one complementary metal oxide semiconductor passgate having an n-type field effect transistor and a p-type field effect transistor, and selecting includes providing two single-stage domino buffers, one of p-type and one of n-type to control the nfet and pfet transistors of the passgate multiplexer such that during the precharge period, all passgates of the passgate multiplexer remain off.

17. The method as recited in claim 15, wherein the at least two sense amplifiers output to an inverter stage to provide a gain and isolation from any kick-back from subsequent clocked circuits.

18. The method as recited in claim 15, wherein maintaining includes providing a regenerative buffer having a pair of cross-coupled tristate inverters configured to maintain the output of the passgate multiplexer during the pre-charge period.

19. The method as recited in claim 18, wherein the regenerative buffer includes an inverter stage that serves as an output driver stage that drives feedback loops for the dynamic tap and the static tap.

20. The method as recited in claim 15, wherein the DFE includes a multi-level DFE, where the multi-level includes greater than two levels.

\* \* \* \* \*